Dec. 13, 1955  B. HOPKINS, JR  2,726,612
RUG MAKING MACHINE

Filed July 18, 1952  9 Sheets-Sheet 1

INVENTOR.
BLAKE HOPKINS JR.
BY
James and Franklin
ATTORNEYS

Dec. 13, 1955
B. HOPKINS, JR
2,726,612
RUG MAKING MACHINE
Filed July 18, 1952
9 Sheets-Sheet 2
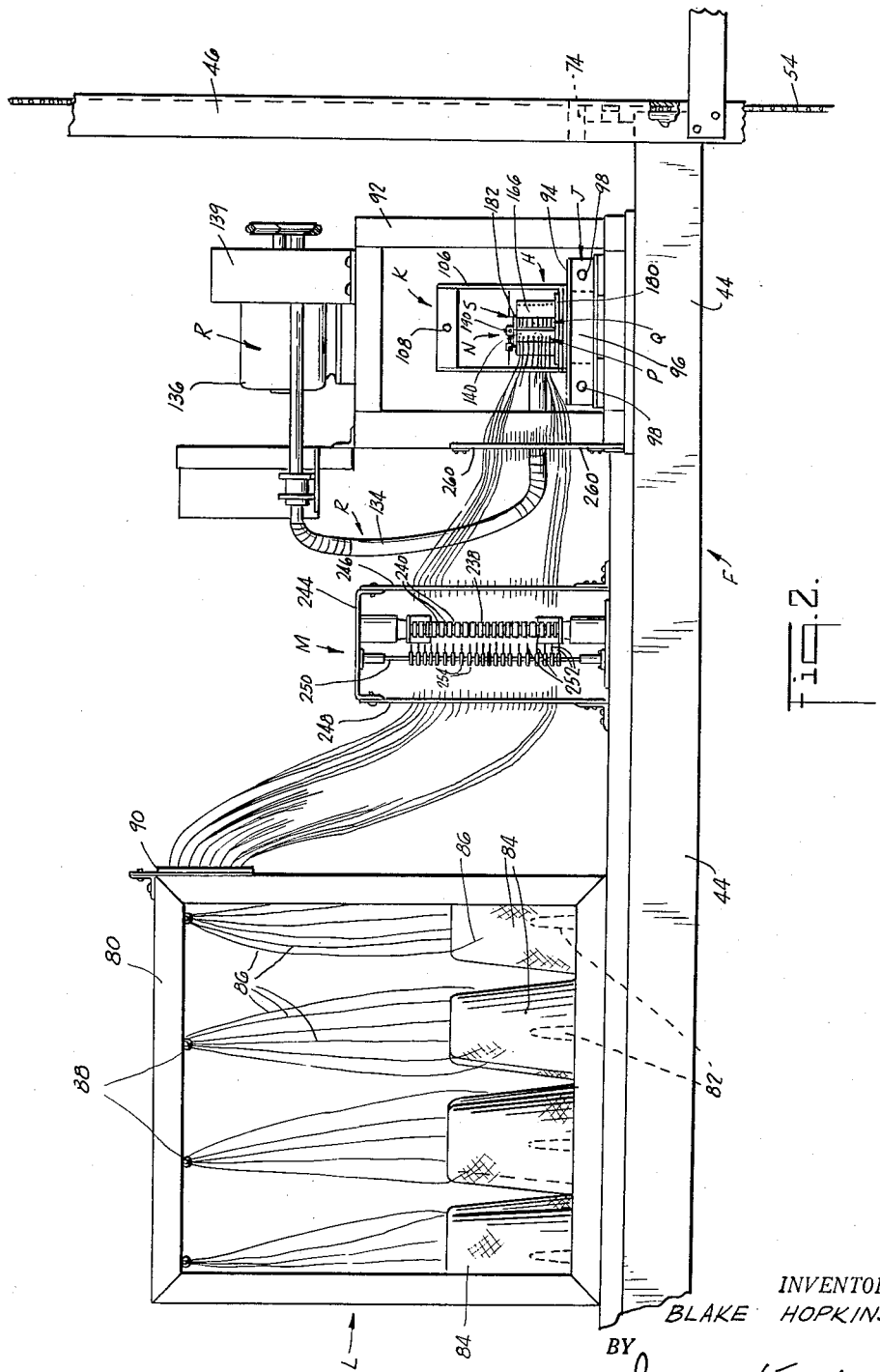
INVENTOR.
BLAKE HOPKINS JR.
BY
James and Franklin
ATTORNEYS

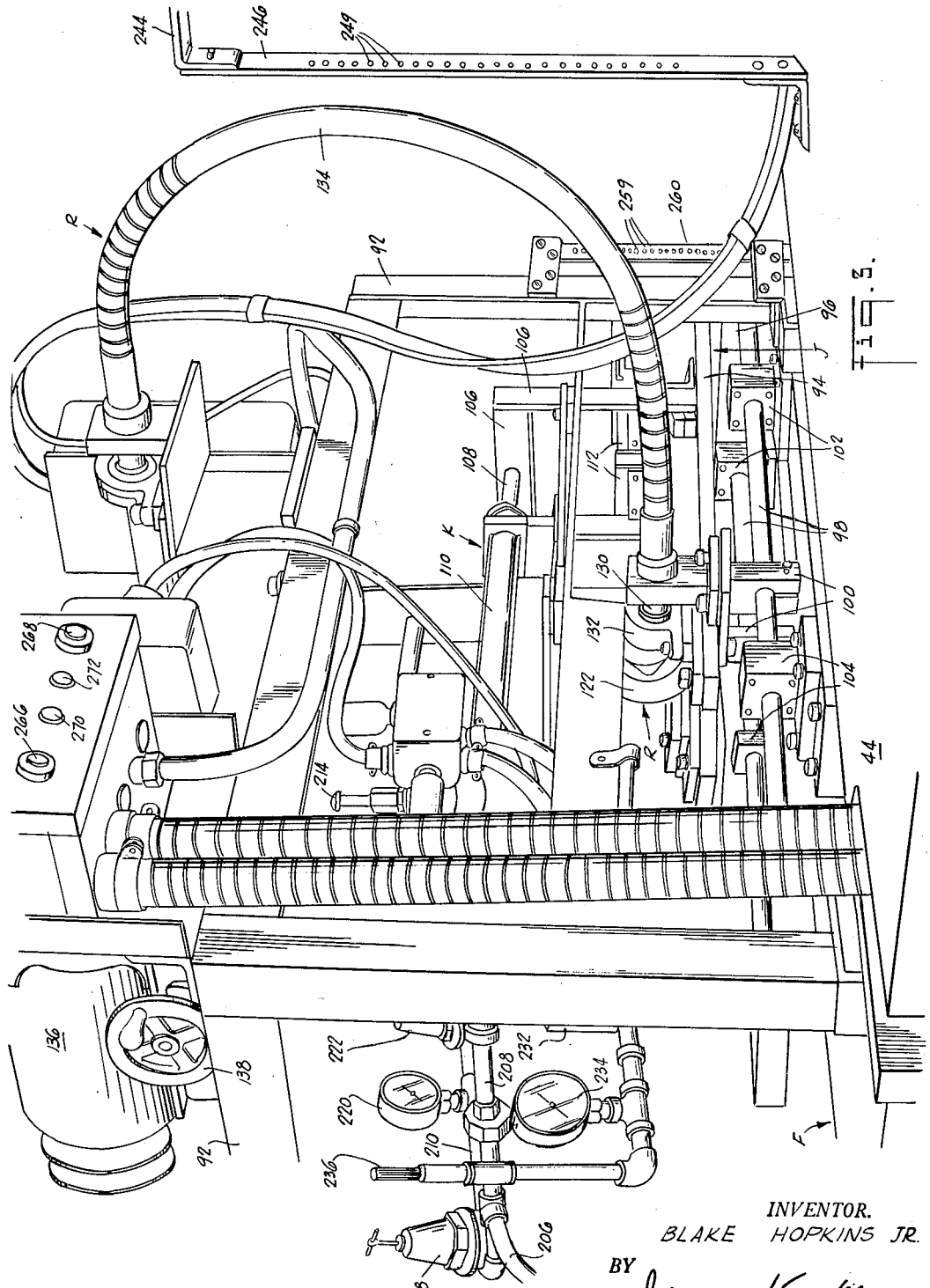

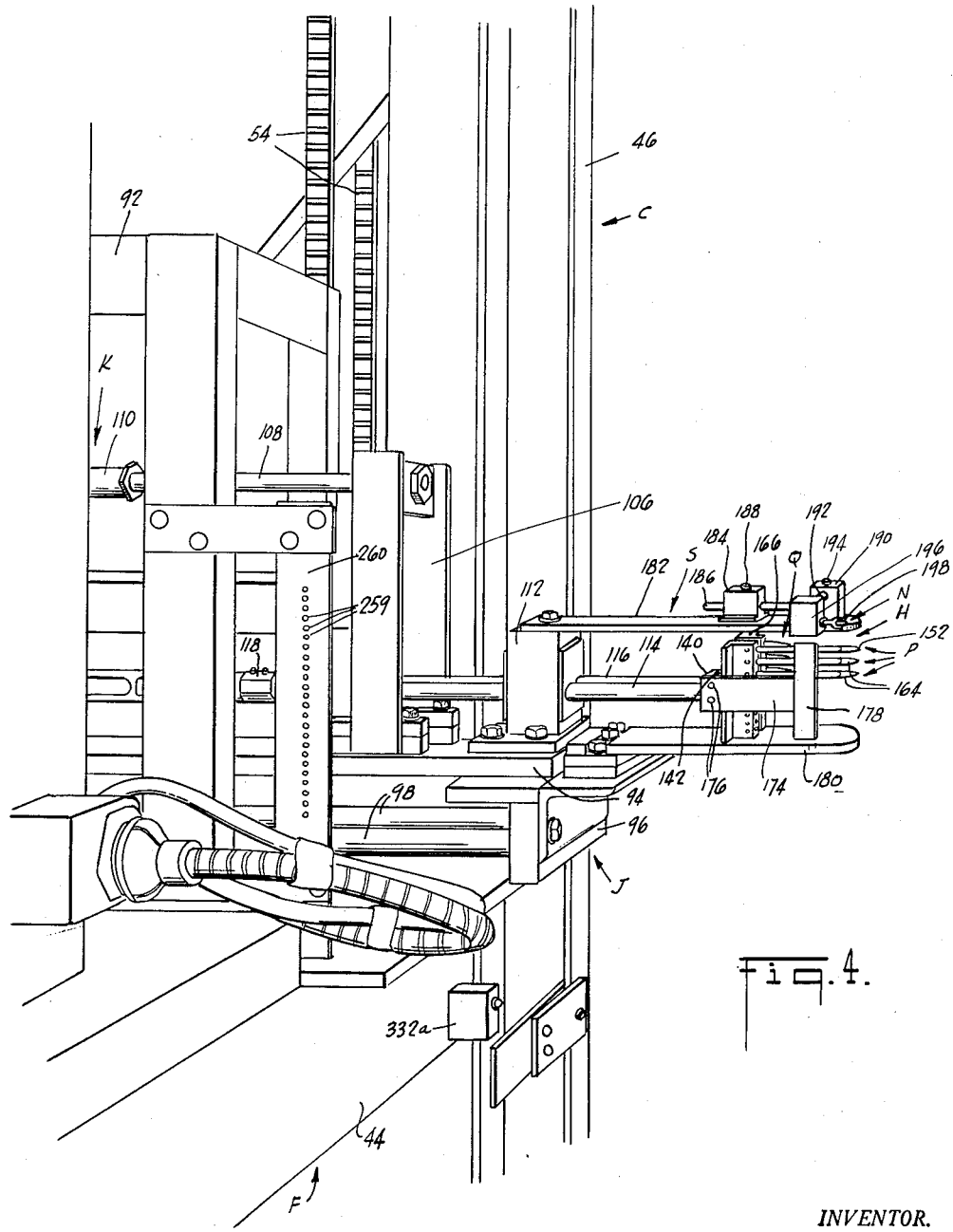

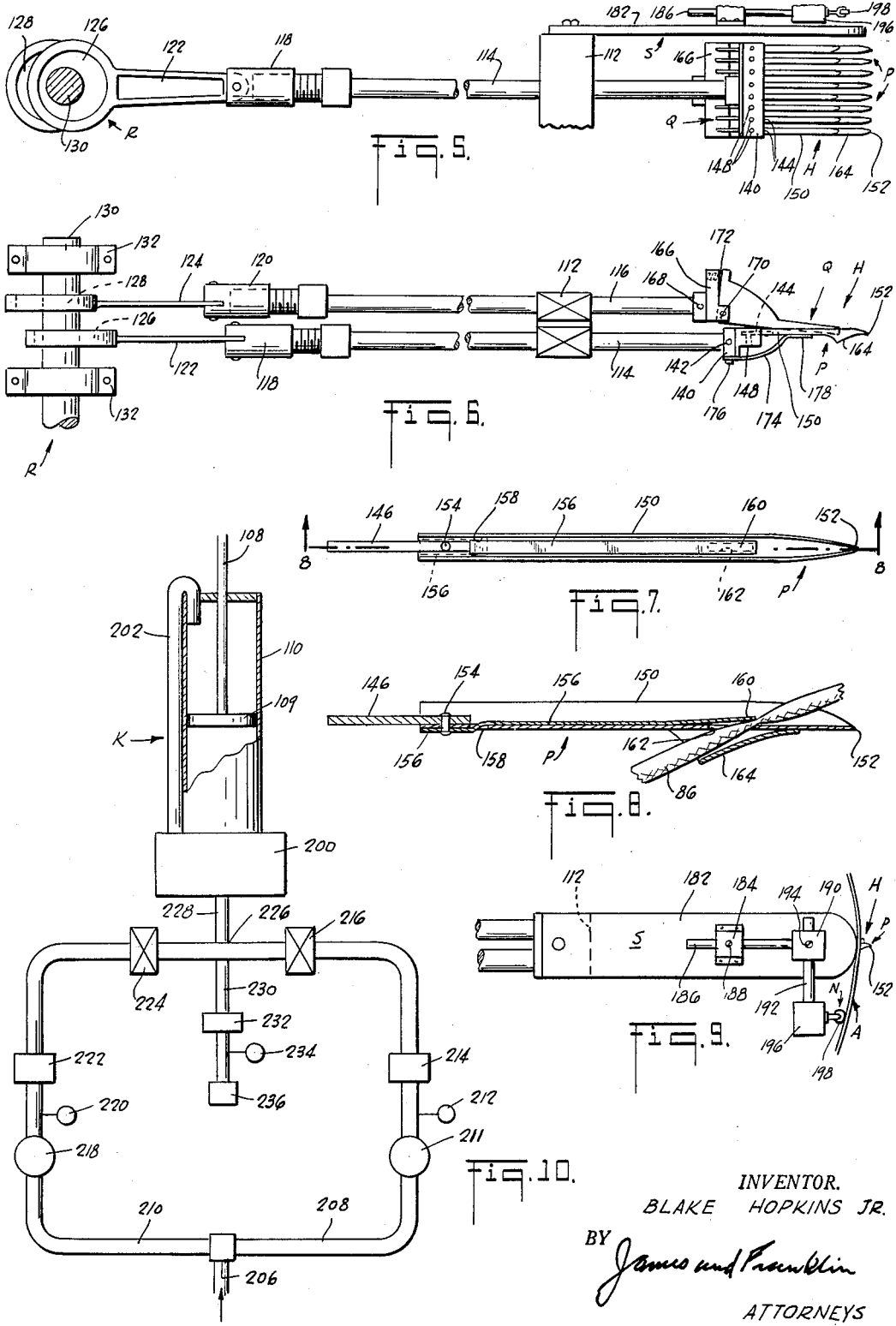

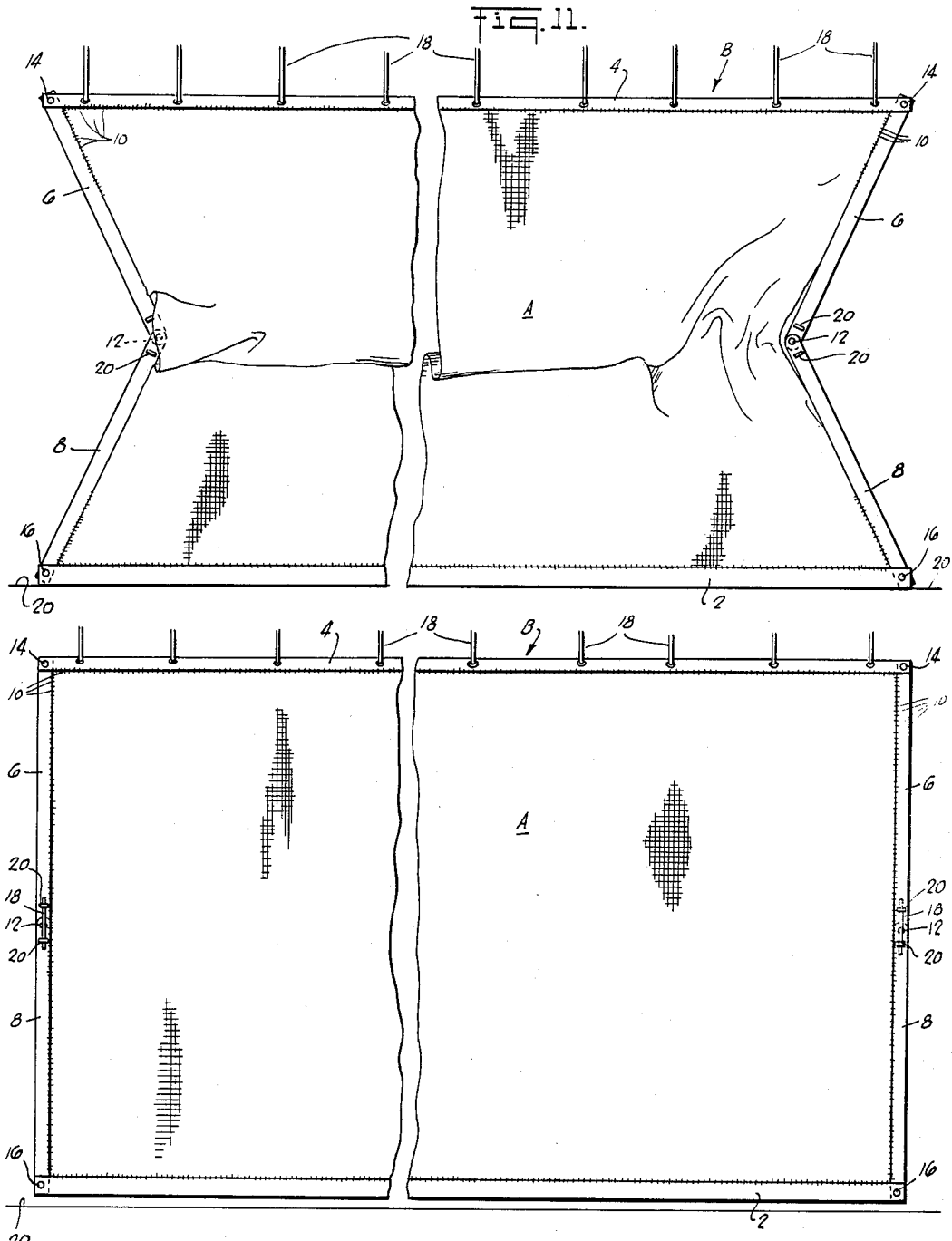

Dec. 13, 1955  B. HOPKINS, JR  2,726,612
RUG MAKING MACHINE
Filed July 18, 1952  9 Sheets-Sheet 7

INVENTOR.
BLAKE HOPKINS JR

BY
*James and Franklin*
ATTORNEYS

Dec. 13, 1955      B. HOPKINS, JR      2,726,612
RUG MAKING MACHINE
Filed July 18, 1952      9 Sheets-Sheet 9
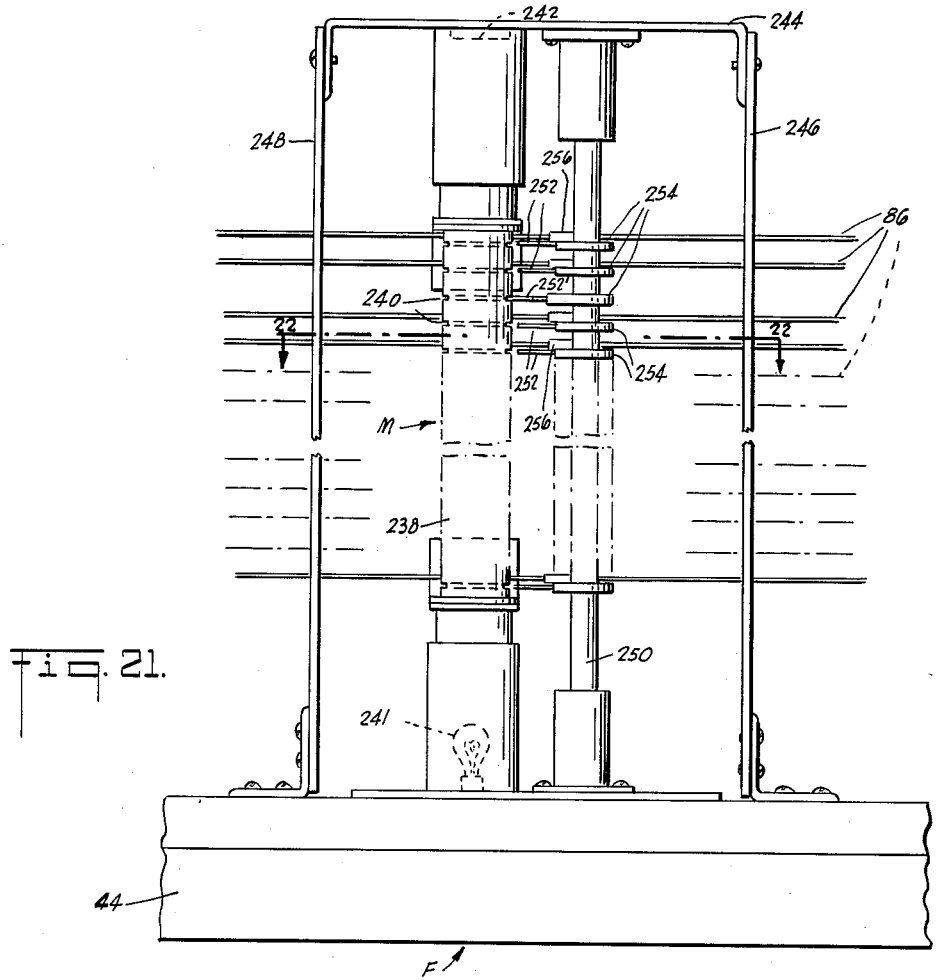
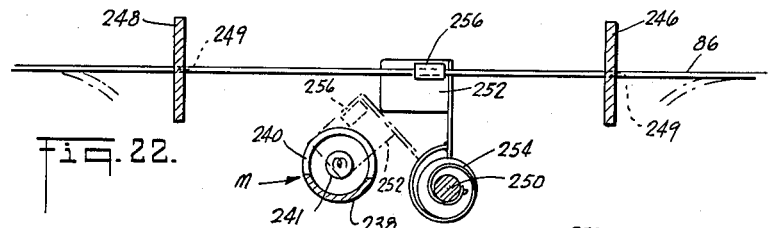
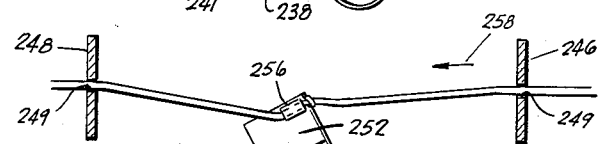
INVENTOR.
BLAKE HOPKINS JR.
BY James and Franklin
ATTORNEYS United States Patent Office 2,726,612
Patented Dec. 13, 1955

2,726,612

RUG MAKING MACHINE

Blake Hopkins, Jr., Chicago, Ill., assignor to Floor Coverings Co. of Puerto Rico, Inc., St. Just, Puerto Rico, a corporation of Puerto Rico Application July 18, 1952, Serial No. 299,629

14 Claims. (Cl. 112—79)

The present invention relates to a machine for ornamenting a sheet of backing material, and more particularly to a machine adapted to form rows of loop-type stitches in an elongated sheet of backing material such as burlap, cotton or the like so as to produce rugs or carpets of the hooked or pile type.

In the past, in the making of this kind of article, a sheet of appropriate and usually somewhat open-weave material has been supported adjacent to stitching mechanism of various types, and relative motion of the stitching mechanism along the sheet is produced, a supply of yarn or other ornamental strands being fed to the stitching mechanism and by that mechanism being stitched into the backing material so as to project out from one face of the backing material, thus defining an ornamented surface, a pile surface being produced by cutting the tips of loop stitches formed on the backing material. With one conventional type of stitching mechanism stitching elements are provided on both sides of the backing material, those elements moving together and in registration so as to form loops. This type of apparatus is exceedingly complex and expensive, is therefore quite subject to breakdown and repair, and places a definite limitation on the dimensions of the area of the backing sheet supported at any one time, because of the structural limitations inherent in the mounting of a pair of stitching elements movable in registration on opposite sides of the backing material.

Stitching apparatus does exist which can form the loops from one side (and usually the non-looped side) of the backing material. In one type of such apparatus a needle and a stepper blade are caused to sequentially penetrate the backing material, the length of the loop being determined by the degree to which the stepper blade thus penetrates the backing material. The stepper blade is always projected outwardly from the stitching mechanism to a predetermined degree, but it does not follow that it always penetrates the backing material to that predetermined degree, since if the backing material is slack much of the travel of the stepper blade or of the needle will be taken up in stretching the backing material without penetrating it. Hence when backing material of any appreciable area is to be worked on, as is necessarily the case when rugs or the like are to be made, it has proved to be impossible in the past to obtain uniform loop length over the entire area of the backing material, thus requiring extensive and costly finishing operation. When the stitching mechanism is manually held and moved over one surface of the backing material, it is theoretically possible for a highly skilled operator to achieve uniform loop length by always seeing to it that the backing material is uniformly tautened at the point where it is being penetrated by the stitching mechanism. However, human factors, such as fatigue, disinterest, boredom and the like, make the attainment of this result strictly theoretical from a production point of view. In the non-manual apparatus which has been previously designed the problem of obtaining uniform loop length over backing material of appreciable areas has never been solved, and consequently such apparatus is useable on a production scale only with backing material of extremely limited area, or when only limited areas of the backing material are supported at any one time, the backing material being shifted over its support from time to time to present new areas of the material to the stitching mechanism.

The present invention, in its broader aspects, has to do with an automatic machine which will form one or more rows of stitches along the length of a sheet of backing material which may extend for as much as 100 feet and which may have a height of almost 20 feet, said sheet being supported in fully spread condition, the necessity for shifting the sheet on its support thus being eliminated. Once this expansive sheet of backing material has been covered with stitches to the desired degree, it may be rolled up and will then be substantially in saleable condition, the need for finishing operations being well nigh entirely eliminated.

It will be apparent that with a sheet of backing material having the area above described, no matter how tautly it may be held at its edges, the central portions thereof will be comparatively flexible and hence will tend to move with the needle and stepper blade rather than being penetrated by them. In the apparatus here disclosed, the stitching mechanism is mounted on a support which is urged against the backing material with a predetermined force, and this independently of the action of the stitching mechanism itself. Hence at the point where the stitching mechanism is adapted to penetrate the backing material, the backing material will always have a predetermined degree of tautness, thus resulting in a uniform loop length. For example, as the stitching mechanism is operating on the backing material at a point near its held edges, where the backing material is initially very taut, the predetermined force by which the stitching mechanism support is urged against the backing material will be balanced by the initial tautness of the backing material, thus distorting the backing material only slightly while stitching takes place. By way of contrast, when the stitching mechanism is operating on a point of the backing material remote from its held edges, where the backing material is necessarily inherently much less taut, the stitching mechanism support will force the backing material to bulge outwardly to an appreciable degree, thus increasing its tautness at the point where the stitching mechanism penetrates until that tautness equals the tautness of the backing material at the previous point near its held edges.

It is often difficult to secure a single sheet of backing material having the requisite area, and consequently separate segments of backing material must be seamed to one another to form a backing sheet of desired size. The seamed portions of the backing material will offer greater resistance to penetration by the stitching mechanism than the other portions thereof. In order to produce a uniform appearance and prevent the loop length from differing along the seams, means are provided for urging the stitching mechanism support against the backing material with an increased force when the seamed portions of the backing materials are to be penetrated, the machine of the present invention being provided with a sensing device effective to control said means. As a result, when the stitching mechanism operates on a seam, the backing material is tautened to an increased degree and hence stretched, thus permitting the stitching mechanism to penetrate the seam to the same extent as it penetrates the other portions of the backing material.

In order to provide for expeditious stitching or ornamenting of the vast expanse of backing material here worked with, the backing material is adapted to be supported in taut condition on a vertical frame. The stitching machine is movable along the length of the backing material, and is provided with a vertically positionable platform on which the support for the stitching mechanism is movably mounted so as to be projectable out toward the backing material. Controls are provided by means of which, once the platform has been positioned with respect to the carriage to form one or more lines of stitches along a predetermined area of the backing material, the carriage is caused to move along the backing material while the support for the stitching mechanism engages the backing material with a predetermined force and while the stitching mechanism is reciprocated with respect to its support so as to form the desired line or lines of stitches. Since the stitching mechanism is here shown as of a type which will form stitches only when moved in one direction (hereinafter termed the stitch-forming direction), automatic means are provided to stop the stitching operation and withdraw the stitching mechanism support together with the stitching mechanism itself from the backing material when the end of the backing material has been reached, and to cause this condition of the stitching mechanism to continue while the carriage is being run back in the opposite (and non-stitching forming) direction preparatory to the formation of the next series of rows of stitches on the backing material.

Since the platform is vertically movable with respect to the carriage, such movement of the platform will serve to raise or lower the stitching mechanism and place it in condition for forming the next series of rows of stitches either above or below the previously formed stitch rows. Since stitching cannot take place while the platform is moving, the apparatus of the present invention is provided with an interlock by means of which, whenever the platform is moved, the stitching mechanism support is withdrawn from the backing material and the stitching mechanism itself is not actuated. Since inadvertent movement of the platform with respect to the carriage during the stitching operation is not permitted by the stitching mechanism itself, a further interlock is provided by means of which motion of the platform with respect to the carriage is prevented while the carriage is moving in its stitch-forming direction.

During the time that stitching is taking place, yarn is being fed to the stitching mechanism. It often happens that the yarn strands will break or that knots or other irregularities in the strands will not permit them to pass through the stitching mechanism. Accordingly yarn strand sensing apparatus is included in the machine of the present invention, that sensing apparatus detecting breaks or defects in the yarn and stopping the stitching action of the machine in response thereto, preferably by stopping movement of the carriage in its stitch-forming direction, stopping the stitching mechanism itself, and withdrawing the stitching mechanism and its support from the backing material.

The machine of the present invention is extremely flexible in its mode of operation. Linkages of adjustable length are provided to permit variation in the length of loop produced. The spacing between stitches may be varied within wide limits by controlling the speed of movement of the carriage along the backing material in relation to the frequency with which the stitching mechanism is reciprocated with respect to the support. The vertical spacing between the stitches, when a series of lines of stitches are made simultaneously, may be controlled by varying the vertical spacing between the stitching needles. The movement of the platform with respect to the carriage may be given a step-by-step character, the length of each step being controlled so that the platform will automatically position itself, when moved with respect to the carriage, to form a new series of stitches uniformly spaced from the preceding series of stitches.

The apparatus of the present invention will operate at a speed much in excess of the speed by which similar operations can be performed by hand, thus greatly increasing productivity. A speed of six inches per second along the backing material is quite practical. A very great saving in labor cost is effected by the machine since a single operator can take care of more than one machine, thus supplanting a large number of employees who would be required to produce the stitching by manually guiding the stitching apparatus. A further saving in the cost of the yarn will be effected by reason of the uniformity and continuity of stitching, and finishing and inspection costs are minimized for the same reasons.

It should be borne in mind that when individually operated and hand-carried stitching mechanisms are employed, or even when semi-automatic mechanism is employed of the type heretofore known which is not capable of operating over extensive areas of backing material, a considerable item of cost, both insofar as labor is concerned and insofar as production rate is concerned, is the shifting of the backing material over a frame of a size such as to be capable of being worked upon by the prior art apparatus. With the machine of the present invention, all of this is eliminated, and in addition the initial blocking and stretching of the entire sheet of backing material on its frame eases the difficulties involved in subsequent finishing operations.

The machine of the present invention is a sturdy and efficient one and when once set up for performing a given series of operations will carry out its assigned task in a thoroughly dependable manner. Indeed, the controlled and uniform action of this machine even increases the useful life of the stitching mechanism (needles and stepper blades) over that which has been previously experienced when similar stitching mechanism is manually operated. Because of the uniform and continuous nature of the stitching operations performed by this machine, the carpet produced has an appearance and a uniformity markedly superior to those produced by hand or with other and previously known apparatus.

To the accomplishment of the above, and to such other objects as may hereinafter appear, the present invention relates to a machine for forming a series of rows of stitching in a sheet of backing material, and more particularly to a machine for forming loop stitches in an elongated sheet of backing material so as to produce carpet or the like, as defined in the appended claims, and as described in this specification taken together with the accompanying drawings, in which:

Fig. 2 is a fragmentary front elevational view of the machine, showing the platform and the elements mounted thereon but with the needles and stepper blades removed;

Fig. 3 is a detailed perspective view of a portion of the apparatus mounted on the platform, taken from the rear and the right hand side thereof, and showing particularly the manner in which the stitching mechanism is mounted on its support and the manner in which the support is mounted on and urged out from the platform;

Fig. 4 is a perspective view of a portion of the apparatus mounted on the platform, taken from the front and the right hand side thereof, showing the operative portions of the stitching mechanism on their support with said support partially projected out from the platform;

Fig. 5 is a detail side elevational view showing the stitching mechanism and a portion of the actuating means therefor but with the needle reinforcing member removed;

Fig. 6 is a top plan view of the mechanism of Fig. 5;

Fig. 7 is a top plan view of one of the stitching needles;

Fig. 8 is a cross sectional view thereof taken along the line 8—8 of Fig. 7 and showing a piece of yarn passing therethrough;

Fig. 9 is a top plan view of the forward portion of the stitching mechanism, showing the manner in which the seam-sensing device is mounted thereon and showing the stitching mechanism partially penetrating the backing material;

Fig. 10 is a schematic view showing the arrangement of the controls for urging the stitching mechanism support outwardly from the platform and for withdrawing that support from the backing material;

Figs. 11 and 12 are front elevational views of the backing material and the frame on which it is mounted, Fig. 11 showing the frame and backing material in a preliminary position, before the backing material has been completely secured thereto, and Fig. 12 showing the backing material and frame in their final position;

Figures 13, 14, 15, 16, 17, 18:
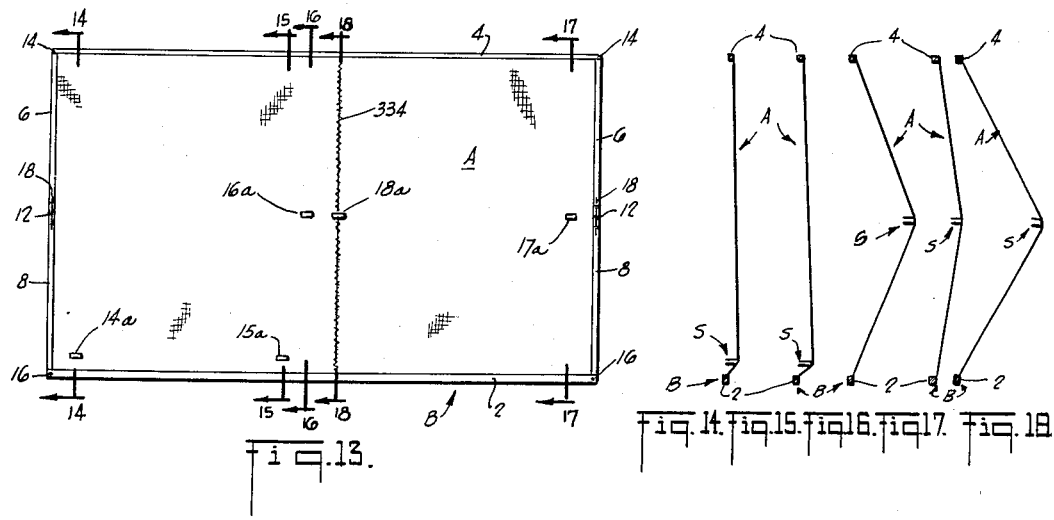
Fig. 13 is a schematic view indicating the expanse of the backing material and designating different points at which the stitching may take place.
Figure 19:
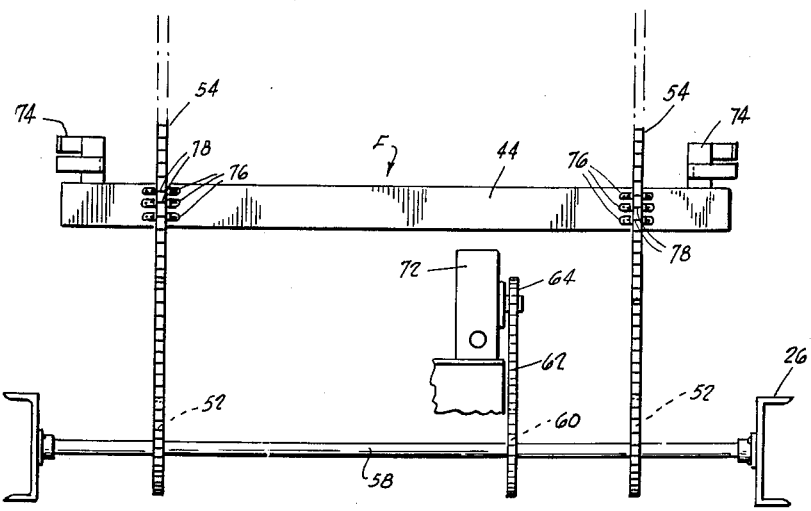
Figure 20:
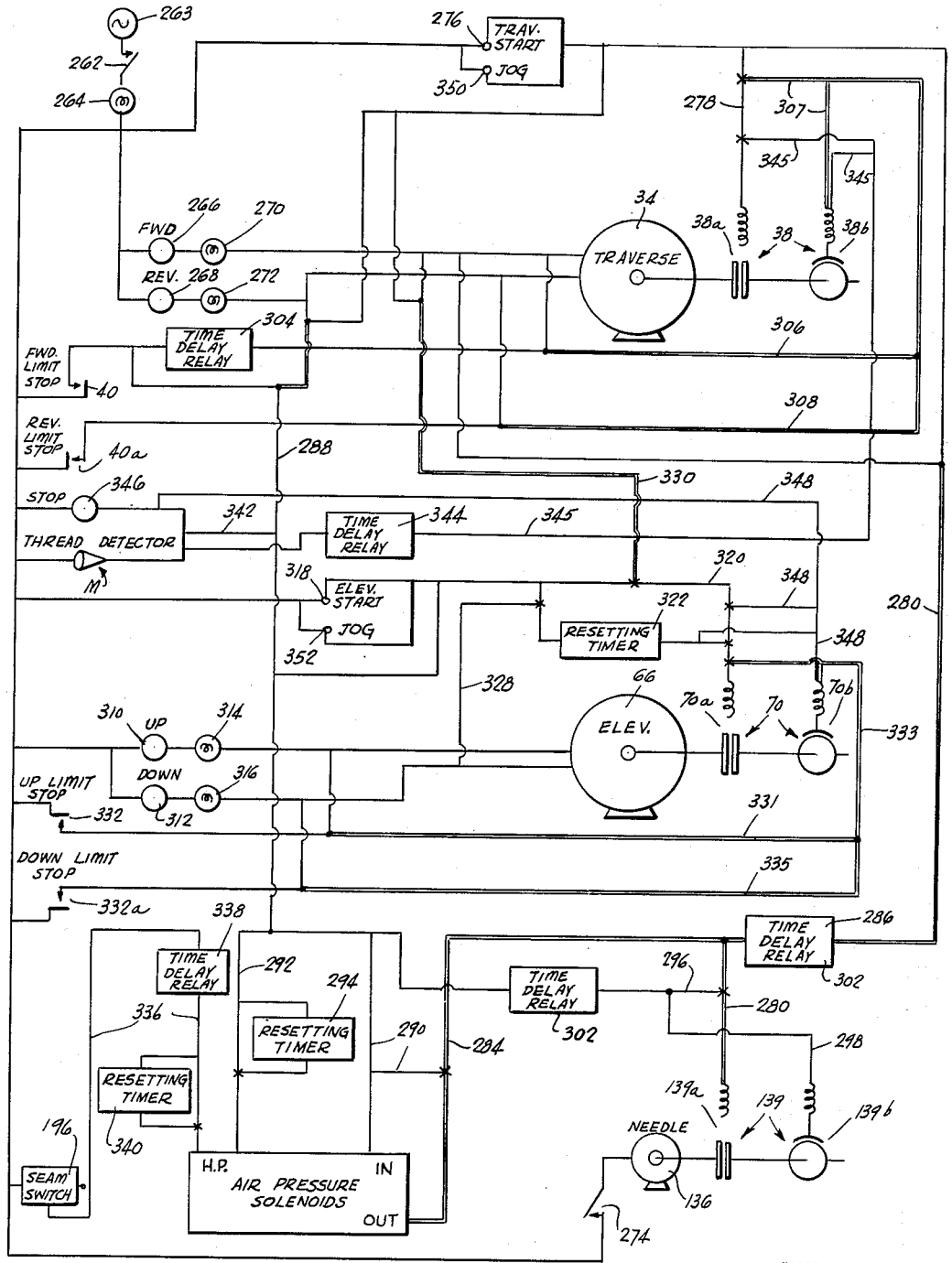

Figs. 14, 15, 16, 17 and 18 are schematic views showing the position of the backing material when stitching takes place at the points indicated on the lines 14—14, 15—15, 16—16, 17—17 and 18—18, respectively of Fig. 13;

Fig. 19 is an idealized view showing the mechanism employed for moving the platform with respect to the carriage;

Fig. 20 is a schematic view showing the control apparatus employed in the machine;

Fig. 21 is a front elevational view of the yarn strand sensing apparatus;

Fig. 22 is a top cross sectional view thereof taken along the line 22—22 of Fig. 21 showing in solid lines the position of the apparatus when the yarn strand is in unbroken condition and showing in broken lines the position of the apparatus if the yarn strand should break; and Fig. 23 is a view similar to Fig. 22 but showing the position the parts of the apparatus assume when an oversized portion of the yarn strand is detected.

While the terms "rug" and "carpet" are here used, it will be apparent that those particular articles of commerce are mentioned solely by way of example, and that the utility of this invention comprehends other comparable articles, such as tapestries, wall or furniture coverings, or the like, and any and all objects which may comprise a sheet of backing material having stitches, and particularly loop stitches, formed over the surface thereof.

General description

The backing material generally designated A is mounted and stretched in a frame generally designated B, that frame being supported in a vertical position. The apparatus of the present invention comprises a carriage C which is movable along carriage guides D adjacent to and along the length of the backing material A by means of a carriage moving mechanism E. Mounted on the carriage C is a platform F, that platform being movable vertically with respect to the carriage C by means of platform moving means G. Stitching mechanism H is mounted on the platform F, preferably on a support J which is projectable out from the platform F toward the backing material A with a predetermined force by means of apparatus generally designated K. The platform F is positionable with respect to the carriage C over a distance substantially equal to the height of the backing material A so that the stitching mechanism H can produce stitches over substantially the entire surface of the backing material A. The stitching mechanism H is operative to produce stitches in only one direction longitudinally of the backing material A, this stitch-forming direction being from left to right as viewed in Fig. 1. Strands of yarn are led from yarn supply L to the stitching mechanism H via a yarn strand sensing apparatus M, that apparatus being effective to detect breaks or excessive irregularities in the strands of yarn.

In view of the size of the backing material A, which in a particular embodiment is 92 feet long and 18 feet 6 inches high, seams are very likely to be present in that sheet, which seams will resist penetration by the stitching mechanism H to a greater degree than the unseamed portions of the backing material A. Hence the machine is provided with a seam sensing device N effective when the stitching mechanism H approaches a seam in the backing material A to so modify the operation of the machine as to cause the stitching mechanism H to penetrate the seam to the same extent as it penetrates the remainder of the backing material A.

The stitching mechanism H may take any conventional form. It is here specifically disclosed for simultaneously producing a plurality of vertically spaced rows of loop stitches, this being accomplished by means of a needle or needles P and an equal number of stepper blades Q, each being reciprocated with respect to one another by needle actuating mechanism R so as to penetrate the backing material A, thus forming a series of rows of stitches along the length of the backing material A as the carriage C moves therealong. The vertical location of the rows of stitches thus formed is determined by the vertical position of the platform F with respect to the carriage C.

When, as is preferred, the stitching mechanism H is mounted on a support J which is independently movable with respect to the platform F in a direction toward and away from the backing material A, the support J is provided with a member S which, when the support J is urged toward the backing material A, engages with that backing material A independently of the stitching mechanism H, thus causing the backing material A to bulge outwardly to a greater or lesser degree depending upon the initial tautness of that point on the backing material A which is engaged thereby and further depending upon the predetermined magnitude of the force with which the support J is urged by the apparatus K toward the backing material A. The needle P and stepper blade Q are reciprocal for stitching purposes so that their tips will be projected out beyond the member S, and hence when the member S is in engagement with the backing material A the needles P and stepper blades Q will penetrate that backing material and form stitches, and specifically loop stitches, therein.

The backing material

The backing material comprises one or more segments of a fabric suitable for the purpose for which the finished product is designed. If more than one segment is employed, those segments are seamed together so as to form a single sheet A of desired length and width. Burlap or woven cotton fabrics, preferably having a somewhat open weave, are often employed as backing material in the manufacture of rugs or carpets, but it will be understood that the particular nature of the backing material is not of the essence of the present invention so long as it is penetrable by the stitching mechanism H.

The single sheet of backing material A is mounted in a vertical position on the frame B, that frame comprising (as may best be seen from Figs. 11 and 12) a heavily weighted bottom member 2 and a top member 4 joined together at each end by hinged side members 6 and 8, all of those members being provided with a large number of pins 10 or other securing devices by means of which the sheet A of backing material can be secured at its edges to the frame members. Since the members 6 and 8 are pivotally connected to one another at 12 as well as to the members 4 and 2 at 14 and 16 respectively, the frame B is vertically collapsible as shown in Fig. 11. The top member 4 has a series of lines 18 secured thereto by means of which it can be lifted with respect to the floor surface 20.

Initially the frame B is lowered until its bottom member 2 rests on the floor and its side members 6 and 8 are caused to collapse inwardly so that the top member 4 closely approaches the bottom member 2. The sheet of backing material A is first secured all along its top edge to the top member 4, after which that top member 4 is lifted until it is a predetermined distance above the floor 20, which distance is determined by the type of material of which the backing material A is formed and the desired tension which is to be imparted to the backing material A while it is held in the frame B. With sheets A of a size comparable to that previously set forth, this position of the top member is such that the point 12 is inset approximately 18 inches with respect to a line between points 14 and 16 when a cotton packing sheet A is employed, and 10 inches when a burlap backing sheet A is employed. Thereafter the bottom edge of the backing material A is secured to the bottom frame member 2 and those portions of the side edges of the backing material A nearest its top and bottom edges are secured to the side frame members 6 and 8 near the points 14 and 16. The top frame member 4 is then raised an additional distance, this causing the side frame members 6 and 8 to pivot outwardly, thus horizontally stretching and tautening those portions of the backing material A which have already been secured thereto. Additional portions of the side edges of the backing material A are secured to the side frame members 6 and 8, working from top to bottom toward the middle, as the top frame member 4 is lifted step by step. Thus the side edges of the backing material are progressively secured to the side frame members 6 and 8, the central portions of those side edges being secured to the corresponding portions of the side frame members 6 and 8 before those frame members have pivoted so as to align with one another as shown in Fig. 12. When that alignment has been achieved the side frame members 6 and 8 are locked in aligned position as by means of pin 18 passing through rings 20 secured to the frame members 6 and 8. This alignment will take place only when the frame member B is lifted so that the lower member 2 is raised from the floor surface, the weight thereof stretching the backing sheet A vertically and thus tautening it in that direction, while the outward swinging of the side frame members 6 and 8 have previously provided for lateral stretching and tautening of the backing material A.

It takes four men approximately five minutes to perform the operation of securing the backing sheet A to the frame B. Had the frame B been rigid instead of articulated, it would have taken many hours for the same number of men to accomplish the same result, and the stretching or tautening of the backing material A would by no means have been as uniform as when the above described procedure is carried out.

The carriage

Mounted on the floor 20 closely adjacent to the backing material A when supported in the frame B are a pair of rails 22 defining the guiding means D for the carriage C. In order to at least partially fix the position of the backing material A with respect to the adjacent rail 22, suitable stops may be provided on the floor and engageable with the lower frame element 2 if desired.

The carriage C comprises a structural base 26 having axles 28 journalled at opposite ends thereof, wheels 30 being mounted on the axles and having flanges 32 engageable with the inner surfaces of the rails 22 so as to rigidly guide the carriage C for movement along the rails 22. A motor 34 is mounted on the carriage, and is connected, via any appropriate speed change mechanism 35 controlled by hand wheel 36, and an electrically actuated clutch brake 38, to at least one of the wheels 30, here indicated as the right hand rear wheel, rotation of the motor thus causing the carriage C to move along the rails 22. As here disclosed the motor 34 may be rotated in either direction, thus permitting it to move the carriage C either from left to right to form stitches or from right to left to return the carriage C to its starting position. In order to assist in stopping the carriage C the electrically actuated clutch-brake 38 may include a clutch 38a and a braking mechanism 38b effective whenever the clutch is disengaged to restrain rotation of the driven wheel 30.

The specific nature of the motor 34, speed control mechanism 36, and clutch-brake mechanism 38, and the precise manner in which operative driving connection is made between the motor 34 and the rails 22, are not essential to the present invention, various types of apparatus capable of accomplishing those functions being well known and readily available on the open market.

Figure 1:
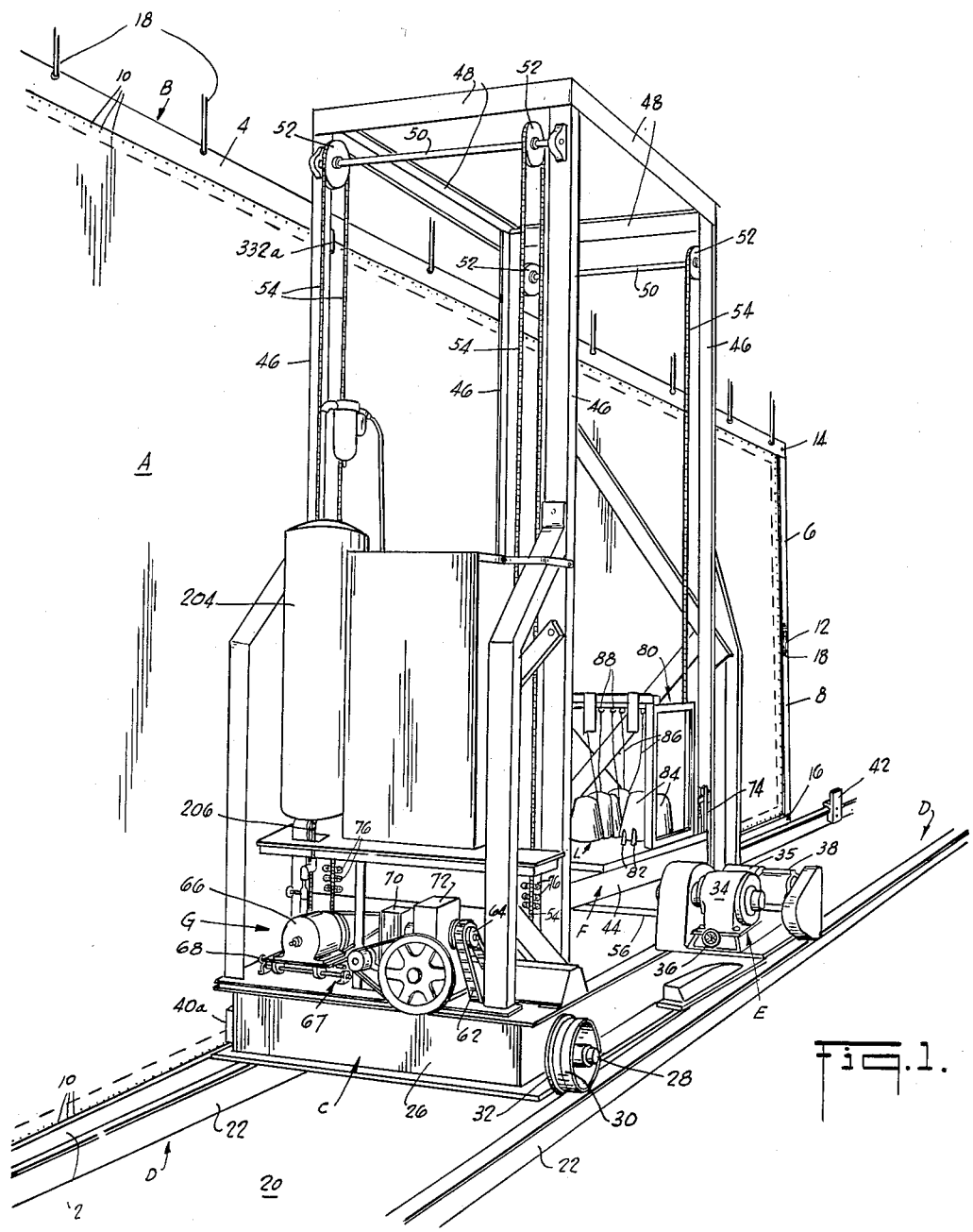
Fig. 1 is a three-quarter perspective view, taken from the left hand side and the rear, of the machine of the present invention in a position intermediate between the ends of the backing material.

A pair of limit switches 40 and 40a are mounted on the carriage base 26 at opposite ends thereof, these switches being adapted to cooperate with dogs 42, one at each end of the rails 22, so as to automatically stop the carriage C when it has reached its limit of travel in either direction. In Fig. 1 only the left hand limit switch 40a and the right hand track dog 42 are shown. These switches and dogs may take any conventional form, and hence their details are not here shown. It is preferred that the dogs 42 be adjustably mounted on the rails 22 so that they may be positioned along the length thereof corresponding to the length of different frames B, it being understood that the dogs 42 will be so positioned with respect to the ends of the backing material A supported in the frame B that motion of the carriage C in the right hand direction will be stopped when the stitching mechanism H carried thereby has reached the point where the row of stitches is to be terminated on the backing material A, the carriage C being stopped from movement in the opposite direction when the stitching mechanism H carried thereby has come opposite the point where the next rows of stitches are to be commenced.

The Platform

As may best be seen from Figs. 1, 2 and 19, the platform comprises a base 44 extending over a substantial portion of the length and width of the base 26 of the carriage C and fitting between the four angle-iron uprights 46 which extend upwardly from the base 26 of the carriage C. The upper ends of these uprights 46 are connected by members 48 so as to produce a rigid structure. Shafts 50 are mounted at the upper ends of the uprights 46 so as to extend respectively between the left hand and right hand pairs thereof and gears 52 are mounted thereon over which endless sprocket chains 54 pass. Shafts 56 (see Fig. 1) and 58 (see Fig. 19) are mounted on the carriage base 26 directly underneath and parallel to the shafts 50, these shafts 56 and 58 also having gears 52 mounted thereon around which the lower ends of the sprocket chains 54 extend. The shaft 58 has a driving gear 60 secured thereto intermediate its length, that gear being connected by means of driving chain 62 to a driving pulley 64 which is rotated by a reversible motor 66 mounted on the carriage base 26 and connected thereto by means of a variable speed drive 67 controlled by the hand wheel 68, an electrically actuated clutch-brake 70 including clutch 70a and brake 70b, and a gear reducing unit 72, these units constituting the means G for moving the platform F with respect to the carriage C. As was the case with the means E for moving the carriage C along the guiding means D, the specific nature of the components of the driving means G forms no part of the present invention, units of different types for carrying out the described functions being readily available on the open market. Some suitable driving interconnection between shafts 58 and 56 is provided, so that both ends of the platform F are raised together and to the same extent.

In order to guide the platform base 44 in vertical movement along the uprights 46, means are provided at the corners of the base 44 engageable with the inner surfaces of the uprights 46, those means being constituted by shoes 74 secured to the platform base 44 and conforming to the angled interior of the uprights 46 (see Figs. 1, 2 and 19). It is preferred that the shoes 74 at one end of the base 44 be rigid with respect to the base 44 while the shoes at the other end of the base 44 be mounted thereon so as to be resiliently urged against the inner surfaces of the upright 46.

The platform base 44 is fixedly secured to the inner strand of all four of the sprocket chains 54 in any suitable manner, as by having a series of brackets 76 secured to the end surfaces thereof through which the sprocket chain 54 passes, rods 78 passing through the brackets 76 and serving to interconnect the links of the sprocket chain 54.

An open framework 80 is mounted on the base 44, preferably at the right hand end thereof, a plurality of pegs 82 extending upwardly from the base 44 within the framework 80 so as to support a plurality of cones of yarn 84. In the embodiment here specifically disclosed, where as many as eight separate sets of needles P and stepper blades Q are provided, each set being simultaneously capable of handling three strands of yarn so as to form loop stitches of appreciable substantiality, twenty four pegs 82 are provided for mounting twenty four separate cones of yarn 84. A single strand of yarn 86 is led upwardly from each of the cones 84 to guiding means at the top of the frame 80, here shown as eyes 88, from which the strands 86 extend through a guiding plate 90 secured to the left hand forward portion of the frame 80 and provided with a separate aperture for each strand of yarn 86. The individual strands are then led through the yarn strand sensing mechanism M and to the stitching mechanism H.

The stitching mechanism and its support

The left hand end of the platform base 44 is provided with another structural framework 92 on which is mounted the stitching mechanism H and the support J therefor. The support J (see Figs. 3 and 4) takes the form of a horizontal plate 94 secured by means of bracket 96 to the front ends of a pair of rods 98 and secured to rear portions of those rods by means of clamps 100. The rods 98 are in turn mounted on the platform base 44 by being slidable through front and rear bearings 102 and 104 secured to the platform base 44. The plate 94 is provided with an upwardly extending bracket 106 to which is fastened the outwardly projecting end of a piston rod 108 receivable within pressure cylinder 110 fixedly mounted on the framework 92.

Mounted on the forward end of the plate 94 is a bearing block 112 within which a pair of rods 114 and 116 are slidable, the inner ends of those rods being pivotally connected, by means of adjustable length screw connectors 118 and 120 respectively, to a pair of crank arms 122 and 124 each enveloping an eccentric 126 and 128 respectively which are in turn mounted on transverse shaft 130 journalled in bearings 132 at the rear end of the plate 94. The shaft 130 is rotated by means of a flexible shaft 134 driven by a motor 136 mounted on the top of the framework 92 and connected to the flexible shaft 134 by means of an adjustable speed mechanism controlled by handwheel 138 and any appropriate electrically actuated clutch and brake mechanism 139 including clutch 139a and brake 139b. Hence when the motor 136 is in operation and is operatively connected to the shaft 134, the rods 114 and 116 will be reciprocated, it being apparent from Figs. 5 and 6 that the phase of reciprocation of the rods 114, 116 will be shifted by approximately 180 degrees.

A housing 140 is removably mounted on the projecting end of the rod 114 by means of set screws 142. The forward portion of this housing is provided with a plurality of horizontal apertures 144, here shown as eight in number, into which the mounting stems 146 of the needles P may be received, those stems being secured in place by means of set screws 148. In this way, any desired number of needles P may be utilized simultaneously, the vertical spacing between the needles P being determined by the vertical spacing between the apertures 144. If a different vertical spacing is desired, a different bracket 140 will be employed.

Each of the needles (see Figs. 7 and 8) comprises an arched shell 150 tapering to a penetrating point 152 at its forward end and secured at its rearward end to the stem 146 by means of rivet 154 and preferably solder or the like. A spring plate 156 has its rearward end secured to the outer surface of the shell 150 by the same rivet 154, the plate then passing into the interior of the shell 150 through aperture 158 and extending forwardly so that its other and free end 160 substantially overlies another aperture 162 in the shell 150, the yarn strand or strands 86 entering the shell 150 through the aperture 162, the shell being provided with an external enlarged guiding portion 164 through which the yarn strand 86 extends. As will be apparent from Fig. 8, the free end 160 of the spring blade clamps or constricts the yarn strand 86 as it passes through the aperture 162, thus forcing the yarn strand to be pulled forward with the needle P when that needle moves forward, but permitting the needle P to slide rearwardly over the yarn strand 86 when the needle P moves to the rear and the yarn strand 86 is prevented from thus moving.

A housing 166 is movably secured to the forward end of the rod 116 by means of set screw 168, that housing having a plurality of ears 170 between which individual stepper blades Q can be pivotally mounted, individual compression springs 172 being active between the housing 166 and the stepper blades Q so as to tend to cause those blades to pivot in a clockwise direction as viewed in Fig. 6 so that their tips enter the shells 150 of the needles P and slide therealong. It will be understood that there is a stepper blade Q for each needle P, that the blades Q and the needles P are positioned opposite one another, and that during the operation of the device the same number of needles P and blades Q will be secured respectively to the housings 140 and 166.

In order to provide added rigidity to the needles P and thus prevent breakage or damage, a fairly rigid T-shaped reinforcing member 174 (omitted from Fig. 5) is secured to the bracket 140 by means of screws 176, the vertical arm 178 of this member engaging the convex surfaces of the needles P rearwardly of the point where the yarn strands 86 enter those needles so as to prevent the needles P from bending.

A bumper plate 180 (see Fig. 4) is secured to the plate 94 so as to extend outwardly under the housings 140 and 166, the tip of this plate being positioned forwardly of the innermost position of the tips of the needles P and stepper blades Q. Secured to the top of the block 112 and extending outwardly therefrom is a second bumper plate 182 the tip of which extends forwardly beyond the tips of the needles P and stepper blades Q when they are in their rearmost position the tips of the plates 180 and 182 being in vertical alignment. The needle and stepper blade tips extend out beyond the tips of the bumper plates 180 and 182 when the needles P and stepper blades Q are projected to their outermost position. The bumper plates 180 and 182 thus define the element S carried by the stitching mechanism support J which, when that support J is urged outwardly from the platform F toward the backing material A, engages that backing material A independently of the stitching mechanism.

A block 184 is mounted on the top of the plate 182 through which a rod 186 is adjustably slidable, being held in adjusted position by means of screw 188. The rod 186 carried at its forward end a block 190 through which a laterally extending rod 192 adjustably extends, the position of the rod 192 in the block 190 being fixed by means of screw 194. It will be noted that the rod 192 extends from the bumper 182 in the stitch-forming direction, that is to say, from that side of the bumper 182 on which the needles P are mounted. The rod 192 carried switch 196 controlled by a feeler wheel 198. The position of the switch 196 is adjusted with respect to the bumper 182 so that, when the tip of the bumper is in engagement with the backing material A, the feeler wheel 198 will move along the backing material A in advance of the stitching mechanism. When the stitching mechanism approaches a seam in the backing material A, that seam, being of increased thickness when compared with the body of the backing material A, will force the feeler wheel 198 inwardly, thus energizing the switch 196 for a purpose to be described hereinafter in detail. It will be appreciated that the position of the switch 196 may be adjusted so that the feeler wheel 198 will lead the stitching mechanism by any desired degree when the carriage C is moving in a stitch-forming direction.

The stitching mechanism support J is urged toward and withdrawn from the backing material A by means of pressure applied within the pressure cylinder 110 to the piston 109 secured to the piston rod 108. The pressure controls are illustrated schematically in Fig. 10 and include a two-way solenoid valve 200 with built-in venting which controls whether the pressure is applied to the inner surface of the piston 109 or, via the conduit illustrated schematically at 202, to the outer surface thereof, application of pressure in the first direction urging the stitching mechanism support J outwardly toward the backing material A and application of pressure in the second direction retracting the stitching mechanism support J and disengaging the bumper 182 from the backing material A. Pressure is derived from a pressure tank 204 mounted on the carriage C and connected, by means of conduit 206, to branch lines 208 and 210. Connected in series in branch line 208 is an adjustable regulating valve 211, a gauge 212, a normally open solenoid valve 214 and a check valve 216 which will permit pressure to be exerted only in the direction in which the valves and gauges have been enumerated. The branch line 210 similarly includes an adjustable regulating valve 218, a gauge 220, a solenoid valve 222 and a check valve 224, but the solenoid valve 222 is normally closed, thus differing from the valve 214 which is normally open. The regulating valves 211 and 218 are set so that branch line 208 produces a lower pressure than branch line 210. Where the lines 208 and 210 again meet at 226 is a line 228 leading to the two-way solenoid valve 200 and a line 230 leading to a normally open solenoid valve 232, a gauge 234 and an adjustable relief valve 236. It will be apparent that the setting of the regulating valves 211 and 218 will determine the pressure exerted on the piston 109, and hence will determine the force with which the stitching mechanism support J is urged out toward the backing material A or urged inwardly away from the backing material A. The magnitude of the pressures will vary depending upon the tension desired in the backing material A at the points where stitching takes place and this in turn will depend upon the nature of the backing material itself. Purely by way of example, it has been found desirable when burlap is employed for the backing material A to use a low pressure of 23 lbs. per sq. in. and a high pressure of 45 lbs. per sq. in. whereas when cotton is used for the backing material A a low pressure of 27 lbs. per sq. in. and a high pressure of 40 lbs. per sq. inch is desired. The increased low pressure for cotton is derived from the fact that the cotton is somewhat more closely woven than the burlap, and the increased high pressure for burlap when compared with cotton derives from the fact that when burlap is seamed its open-weave character is substantially destroyed and it is then more difficult to penetrate than seamed cotton. When the solenoid valves 214, 222 and 232 are in their normal conditions, low pressure is applied to the piston 109. When the solenoid valves 214 and 232 are closed and the solenoid valve 222 is open high pressure is applied to the piston 109. The two-way solenoid valve 200 controls the side of the piston 109 to which pressure is applied.

Yarn strand sensing apparatus

The apparatus for detecting breaks or undesired irregularities in the yarn strand 86 is best shown in Figs. 21, 22 and 23, that apparatus being mounted on the platform base 44 between the framework 80 in which the yarn cones 84 are mounted and the framework 92 in which the stitching mechanism H is secured. That mechanism comprises a hollow tube 238 provided with a series of lateral notches 240, one for each strand of yarn 86 and here shown as twenty four in number. A light source such as the bulb 241 is mounted at the bottom of the tube, and a light sensitive element such as a selenium cell 242 is mounted at the upper end of the tube, light passing through the tube from the former to the latter. The tube is mounted between the base 44 of the platform F and a crosspiece 244 secured between a pair of plates 246 and 248, each of those plates having registering apertures 249 vertically in line with the slots 240 but to one side of the tube 238, as may best be seen from Figs. 23 and 24. Each yarn strand 86 is adapted to pass through one of the registering pairs of apertures in the plates 246 and 248 on its way to the stitching mechanism H.

A rod 250 is mounted between the platform base 44 and the crosspiece 244 beside the tube 238. A plurality of flag-like members 252 are resiliently mounted on the rod 250 by means of coil springs 254, each of the flags 252 being positioned in line with one of the tube slots 240 and being normally urged by the coil springs 254 to move into and through that slot 240, thus interposing itself between the light source 241 and the light sensitive element 242, thereby interrupting a predetermined portion of the light passing from the former to the latter. Each flag 252 is provided with a ring 256 through which a yarn strand 86 is adapted to slide. When that strand is unbroken it will retain its flag 252 in the position shown in solid lines in Fig. 22 against the action of the spring 254, but if the strand 86 should break, as indicated in broken lines in Fig. 22, the spring 254 will move the flag 252 through its appropriate slot 240, thus changing the amount of light which impinges on the light sensitive element 242 and cause a change in its energization. (The flag 252' of Fig. 21 is shown in that position.) The yarn strand 86, in moving from the cone 84 to the stitching mechanism H, moves in the direction of the arrow 258 of Fig. 23. If there should be an irregularity in the diameter of the strand, or if the knot joining the ends of two strands together should be of excessive size, that irregularity of knot will not pass through the ring 256, the size of which is closely related to the strand-handling capacity of the stitching mechanism H. If such a strand 86 is pulled toward the stitching mechanism H in the direction of the arrow 258 it will cause the flag 252 to pivot to the position shown in Fig. 23 in which position the flag 252 will have entered its slot and will have partially interrupted some portion of the light passing from the light source 241 to the light sensitive element 242, thus again altering the energization of the latter.

Operation and controls

As will become apparent when the functioning of the stitching mechanism H is described in detail hereinafter, that mechanism is effective to form a line of stitches only in one direction, to wit, in the direction of the needles P with respect to the stepper blades Q. As here illustrated that direction is from left to right as viewed in Fig. 1. Accordingly, in describing the manner in which the machine of the present invention operates, and in setting forth the various controls which are incorporated into the machine, we will start with the carriage C in its position all the way to the left, and with the platform F lowered all the way, the stitching mechanism H then being in position to commence forming a row of stitches along the length of the backing material A at the very bottom thereof. Each yarn strand 86 is led from a cone 84 through the appropriate eye 88, through an alined pair of apertures in the members 246 and 248, passed through the ring 256 on a flag 252 forming part of the yarn strand sensing mechanism M, and then through an appropriate aperture 259 in plate 260 mounted on the right hand side of the framework 92, the free end of the yarn strand 86 then being passed through the aperture 162 in the shell 150 of needle P. Depending upon the size of the needle P and the size of the yarn, one or more yarn strands may be employed with each needle and, as has previously been stated, it is often desired to utilize three yarn strands with each needle in order to produce a carpet of substantial character. As has previously been stated, any desired number of needles P, up to the needle holding capacity of the housing 140, may be employed.

Once the yarn has been thus threaded along the path which it will travel through the machine, the machine is ready for operation. The first step in operating the machine is to start the motors 34 and 136 which will provide the power for moving the carriage C and for actuating the stitching mechanism H. The air pressure tank 204 has previously been charged with air under appropriate pressure. In place of a tank 204, a motor driven air compressor unit could be employed, in which case the motor of said unit would also have to be started.

The various controls provided on the machine, and their mode of interaction, are shown schematically in Fig. 20, and reference to that figure should be made as the sequence of operation and control proceeds. By way of explanation of that figure, it may be stated that when a line meets another line and terminates in an X, that indicates that when the first line is energized it will break the circuit through the second line. When two lines meet and thereafter continue in the form of a double line, that indicates that only when the two meeting lines are simultaneously energized will the double line be energized to perform its indicated functions.

A main switch 262 is first closed to connect the apparatus to a source of power 263, the pilot light 264 then being illuminated. The motor 34 is provided with a pair of control buttons 266 and 268, the direction of rotation of the motor 34 being dependent upon which of the button is pressed, the button 266 causing the motor 34 to rotate in such a direction as to move the carriage C in its forward or stitch-forming direction and the button 268 causing the motor to rotate in the opposite direction. Pilot lights 270 and 272 are provided so as to visually indicate in which direction the motor 34 is rotated. A switch 274 is provided to start the motor 136. When the machine is to be placed into operation, and when it is initially positioned as set forth above, button 266 is pushed and switch 274 is closed. At this time the stitching mechanism support J is in retracted position.

A separate button 276 is pushed to start the operation of the machine once the motors 34 and 136 are rotating in their proper directions. As indicated by line 278, this energizes the clutch 38a, thus operatively causing the motor 34 to move the carriage C from left to right. As indicated by double line 280, when the starting button 276 is pushed and when the motor 34 is rotating in its forward direction, the clutch 139a is energized to connect the stitching mechanism motor 136 to the stitching mechanism H and, via double line 284, the two-way solenoid valve 200 is energized so that low pressure is applied to the inner surface of the piston 109, thus forcing the stitching mechanism support J outwardly until the tip of the bumper plates 180 and 182 engage the backing material A with a predetermined force. It is preferred that these latter operations relative to the stitching mechanism H take place a short time after the carriage C has started its motion, in order that the carriage C might come up to speed before stitching takes place so that all stitches are equally spaced. To this end a time delay relay 286 is interposed in the circuit, this relay preferably being adjustable so that the amount of delay can be varied in accordance with the physical characteristics of the machine and the desired speed of motion of the carriage C.

When the stitching mechanism support J is moved outwardly, the stitching will take place at a point indicated schematically by the rectangle 14a in Fig. 3. Since that point is very close to the supported edges of the backing material A, the material will not be very greatly deflected by the force applied thereto via the bumper 182, that condition being schematically shown in exaggerated form in Fig. 14.

Since the motor 136 is connected to and rotates the shaft 130 via the clutch 139a, the needle P will first be projected forwardly so as to penetrate the backing material A, carrying its yarn strand or strands 86 forwardly with it. Next the stepper blade Q will move forwardly, its tip sliding along the inside of the needle shell 150 until it engages the yarn strand 86, the stepper blade Q penetrating the backing material A through the aperture made by the needle P. Thereafter the needle P will be withdrawn, while the stepper blade Q continues to penetrate the backing material A, thus holding the yarn strand 86 in position. When the needle P has been withdrawn from the backing material A, it will then be projected forwardly again and, because of the motion of the carriage C, will penetrate the backing material at a point somewhat to the right of its previous penetration, the pivotal mounting of the stepper blade Q at 170 permitting this motion, the spring 172 thus being compressed. Next the stepper blade Q is withdrawn, the spring 172 causing it to snap back into the needle shell 150, the stepper blade Q is again projected into the new aperture formed by the needle P so as to engage and hold the yarn strand 86 therein, the needle P is again withdrawn, and so on. This stitching mechanism is of a conventional type, and it is believed that the above description will be adequate to explain its method of operation. Of course, any appropriate type of stitching mechanism could be employed. The length of the loops formed on the side of the backing material A away from the machine will be determined by the extent to which the needle P, and particularly the stepper blade Q, penetrates the backing material A, and this degree of penetration can be adjusted through the adjustable length links 118 and 120. The spacing between stitches in a given row can be controlled by varying the speed of motion of the carriage C relative to the time of the stitching cycle as determined by the setting of the operative adjustable speed mechanism.

As the carriage C moves from left to right lines of stitches will be formed. Eventually the stitching will take place at an area schematically indicated by the rectangle 15a on Fig. 13. Here the backing material A will be somewhat less taut than at the area 14a, since the area 15a is somewhat more remote from the end edges of the backing material A. Consequently here the stitching mechanism support J will be projected outwardly to a somewhat greater extent than formerly, urged by the predetermined force derived from the constant pressure exerted on the inner surface of the piston 109. Consequently, as illustrated in exaggerated form in Fig. 15, the backing material A will be belled out to a somewhat greater extent than formerly, so that the tautness of the backing material A at the point where it is penetrated by the needle P remains substantially constant, the needle P and the stepper blade Q thus penetrating the backing material to the same extent as formerly so as to form loop stitches of uniform length.

This operation will normally continue until the carriage

C reaches its right hand extremity of travel, at which time the dog 42 on the rail 22 will engage the right hand limit switch 40 and energize the same. Having reference to Fig. 20, this will have the following effects: As indicated by line 288, representing a stop circuit, the two-way solenoid 200 will be reversed (see lines 290) so that pressure is applied to the outer surface of the piston 109, thus causing the stitching mechanism support J to be withdrawn, the stitching mechanism H being carried therewith. It is preferred, as indicated by line 292, that this withdrawal be accelerated by reversing the condition of solenoid valves 214, 222 and 232, thus applying high pressure to the piston 109. Once withdrawal has been effected, the high pressure is no longer needed, and consequently an adjustable timed resetting device 294 is also energized which, after a predetermined period of time, automatically restores the solenoid valves 214, 222 and 232 to their normal condition, the two-way solenoid valve 200 remaining in a position such that pressure is applied to the outer surface of the piston 109. Once withdrawal of the stitching mechanism H from the backing material A has been effected, as indicated by line 296, the needle motor clutch 139a is deenergized and, as indicated by line 298, the needle motor brake 139b is applied, thus stopping reciprocation of the needle blades P and the stepper blades Q. It is preferred that this take place after the stitching mechanism H has been withdrawn from the backing material A, and consequently an adjustable time delay relay 302 is included in the circuit.

After the stitching mechanism H has been disengaged from the backing material A, the requisite time delay being achieved by means of an adjustably timed relay 304, and as indicated by double lines 306 and 307, the carriage clutch 38a is deenergized and brake 38b is applied to the carriage so as to bring it to a stop.

In order to return the carriage C to its left hand position so as to form a new row of stitches, the button 268 is pressed, reversing the direction of motion of the motor 34, and the starting button 276 is again pressed. Since now the motor 34 is rotating in its reverse direction, the brake 38b is no longer energized and the clutch 38a can again be energized through line 278, and consequently the carriage C will commence to move from right to left and continue that motion until the left hand limit stop 40a is energized, this limit stop acting, through double lines 308 and 307, to once again deenergize the clutch 38a and apply the brake 38b.

In order to form a new line of stitches it is necessary to raise the platform F. The elevating motor 66 can also rotate in two directions, the direction of rotation thereof being controlled by "up" push button 310 and "down" push button 312, each having appropriate pilot lights 314 and 316. A separate starting button 318 is provided. When it is desired to raise the platform F, the up button 310 is first pressed and then the starting button 318 is pressed, the latter, via line 320, energizing the clutch 70a. In order to automatically position the platform F so as to form a new series of stitch rows at the proper spacing from the previously formed rows of stitches, an adjustably timed resetting device 322 is energized whenever the motor 66 is rotated in such a direction as to raise the platform F, thus automatically stopping the platform F when it has risen to the desired degree. As indicated by line 328, the resetting device 322 is rendered inoperative whenever the platform F is lowered. Motion of the platform F with respect to the carriage C is permitted whenever the carriage C is stationary or is moving in its non-stitch-forming direction, but, as indicated by double line 330, motion of the platform F is prevented whenever the carriage C is in motion in its forward or stitch-forming direction. Limit stops 332 and 332a of any conventional type may be provided on the platform F so as to automatically stop motion of that platform by deenergizing the clutch 70a and energizing the brake 70b whenever the carriage has reached either of its permissible limits of motion, as indicated by double lines 331, 333 and 335.

After a number of series of rows of stitches have been formed, the stitching operation will take place at an area schematically indicated by the rectangle 16a of Fig. 13. At this point, quite remote from the secured edges of the backing material A, the material is normally comparatively loose. Consequently, when the bumper plates 180 and 182 on the stitching mechanism support J engage this portion of the backing material A with its predetermined force, they will bell the backing material A out to a considerable degree, as shown in exaggerated form in Fig. 16, thus causing the tension of the backing material A when it is penetrated by the needles P and stepper blades Q to be substantially the same as when stitching takes place over other areas, such as the areas 14a and 15a, giving rise to the production of stitches of uniform length. Similarly, when stitching takes place over the area indicated by the rectangle 17a of Fig. 13, which point is relatively close to the side edges of the backing material A but comparatively remote from the top and bottom edges thereof, the backing material A will normally have a tension greater than that at point 16a but somewhat less than that at points 14a and 15a and consequently the stitching mechanism support J will force the backing material to bell outwardly to an intermediate degree, as indicated in exaggerated form in Fig. 17.

When, as is often the case, the sheet of backing material is formed of a plurality of segments seamed together along a seam indicated schematically at 334 in Fig. 13, it is somewhat more difficult for the stitching mechanism to penetrate the seamed portion of the backing material A. The feeler wheel 198 of the seam sensing switch 196 engages the surface of the backing material A in advance of the stitching mechanism H, and when it comes in contact with the seam 334 it is deflected so as to close the switch 196 which in turn, as indicated by line 336 in Fig. 20, reverses the position of the solenoids 214, 222 and 232 and thus causes an increased amount of pressure to be exerted on the inner surface of the piston 109. Hence the stitching mechanism support J is urged outwardly with increased force, thus tensioning the backing material A to an increased degree while the stitching mechanism H penetrates the backing material at the seam 334 to facilitate such penetration and cause the loop length to be uniform. In view of the fact that the feeler wheel 198 leads the stitching mechanism H, and because of the inertia of the control system, a time delay is introduced into the circuit by means of adjustably timed relay 338, so that the increased force is applied to the stitching mechanism support J just at the moment when the stitching mechanism H reaches the seam 334. Also, in order to restore the pressure to its initial predetermined value once the stitching mechanism H has passed the seam 334, an adjustably timed resetting system 340 is included in the circuit. The timing of the relay 338 and mechanism 340 will depend upon the speed with which the carriage C is moving, the time lag of the pressure control system and the width of the seam 334. The increased degree to which the backing material A is belled out when stitching through a seam is indicated schematically in exaggerated form in Fig. 18, that degree of distortion of the backing material A corresponding to stitching over the area indicated by the rectangle 18a of Fig. 13.

The yarn strand sensing mechanism M will also stop the operation of the machine. Whenever the energization of the light sensitive element 242 is altered to a predetermined degree by the interruption of a predetermined amount of light passing thereto from the light source 241, as indicated by the connected lines 342 and 288 of Fig. 20, the stitching mechanism support J is retracted and reciprocation of the needles P and stepper blades Q is stopped, and, after a suitable time controlled by adjustably timed relay 344, movement of the carriage C is also stopped, as indicated by line 345.

It will be understood that although the control system here disclosed is only semi-autoomtic, in the sense that manual control of the direction of motion of the motors 34 and 66 and manual initiation of the commencement of motion in any direction is required, the entire machine could be made automatic except when some defect in the yarn strands is detected by the sensing mechanism M. This could readily be accomplished by causing actuation of the forward limit stop 40 to automatically reverse the direction of rotation of the motor 34 and restart the carriage, and by automatically operatively connecting the elevator motor 66, previously caused to rotate in a direction such as to raise the platform F, so as to cause the platform to be raised by a degree determined by the setting of timer 322, the reverse limit stop 40a, when energized, automatically causing the carriage to move in its forward and stitch-forming direction while at the same time causing the stitching mechanism support J to be projected outwardly and operatively connecting the stitching mechanism actuating motor 136 to the stitching mechanism H.

A stop button 346 is provided which will not only cause the carriage C to stop moving and cause the stitching mechanism support J to be retracted and the stitching mechanism H to be disconnected from its actuating motor 136, but will also cause the platform F to stop moving, as indicated by line 348.

Each of the start buttons 276 and 318 are self-holding. For intermittent and manually controlled operation "jog" buttons 350 and 352 are provided.

Summary

The machine of the present invention presents numerous advantages over prior art methods of manufacturing rugs, carpets and the like. In the first place, it permits automatic operation on sheets of backing material of extensive size without any non-uniformity in the stitches thus formed, either as to length or spacing. In the past, when expansive sheets of backing material have been worked upon, they could only be worked upon in segments, and consequently separate and time consuming stretching operations were necessary after the carpet had been stitched. The present machine permits the stitching operation to be performed on sheets of backing material which are already stretched and tautened, thus eliminating or minimizing operations of that type after stitching has been completed. Production with the machine of the present invention is even faster than when a number of individual operators simultaneously work on a sheet of material to produce stitches through manual control of machinery, and obviously a large saving in labor costs results. The uniformity in stitching results in a saving of yarn which is not inconsiderable and an appreciable additional saving in labor costs is realized because of the lack of necessity for finishing operations. Since the machine is automatic and uniform in its application of stitches, no pattern need be imprinted upon the backing for the guidance of individual operators, and this again results in an appreciable saving. Moreover, the machine, because of its uniformity of operation, ease of control and flexibility of use as to number, type and spacing of stitches, greatly increases the life of the needles P and the stepper blades Q over that which they have when manually operated.

While but a single embodiment has been here illustrated, it will be apparent that many variations may be made in the details thereof, and particularly in the nature of the individual components used therein, all without departing from the spirit of the invention as defined in the appended claims.

I claim:

1. In a rug making machine for forming stitches of yarn in a sheet of backing material comprising carriage guiding means adapted to extend alongside a sheet of backing material, a carriage mounted on said guiding means so as to be movable therealong, means for moving said carriage therealong, a platform mounted on said carriage for movement with respect thereto in a direction at right angles to the direction of movement of said carriage, stitching mechanism carried by said platform, movable with respect thereto, and adapted to form stitches in said backing material by alternately extending out from said platform toward said backing material so as to penetrate said backing material and withdrawing from said extended position so as to disengage from said backing material, means to actuate said stitching mechanism while said carriage is moving in a given direction, thus forming a row of stitches along said backing material, and means for positioning said platform in its movement with respect to said carriage so that the location of said row of stitches on said backing material may be controlled; the improvement which comprises first means sensitive to motion of said carriage in a direction other than said given direction and effective to disable the actuating means for said stitching mechanism when said carriage is moving in said other direction, and second means sensitive to the motion of said carriage only in said given direction and effective to energize said actuating means for said stitching mechanism when said carriage is moving in said given direction.

2. In the rug making machine of claim 1, means to delay the actuation of said second means when said carriage is started moving in said given direction until said carriage has come up to speed.

3. In a rug making machine for forming stitches of yarn in a sheet of backing material comprising carriage guiding means adapted to extend alongside a sheet of backing material, a carriage mounted on said guiding means so as to be movable therealong, means for moving said carriage therealong, a platform mounted on said carriage for movement with respect thereto in a direction at right angles to the direction of movement of said carriage, stitching mechanism carried by said platform, movable with respect thereto, and adapted to form stitches in said backing material by alternately extending out from said platform toward said backing material so as to penetrate said backing material and withdrawing from said extended position so as to disengage from said backing material, means to actuate said stitching mechanism while said carriage is moving in a given direction, thus forming a row of stitches along said backing material, and means for positioning said platform in its movement with respect to said carriage so that the location of said row of stitches on said backing material may be controlled, said stitching mechanism being mounted on a support so as to be reciprocable with respect thereto, said support being movably mounted on said platform so as to be projectable out therefrom toward said backing material, an element on said support other than said stitching mechanism adapted to engage with said backing material when said support is projected out from said platform, and means for thus projecting said support outwardly with respect to said platform with a predetermined force, thereby providing for a constant degree of tautness in said backing material where it is penetrated by said loopforming mechanism; the improvement which comprises sensing means on said carriage engageable with said backing material in advance of said stitching mechanism as said carriage moves in said given direction so as to sense the approach of said stitching mechanism to a seam in said backing material, and control means operatively connected thereto and to said support projection means and effective to increase the force with which said support is outwardly projected in response to the sensing of said seam, thus providing for an increased tautness in said backing material when a seam is to be penetrated by said loop forming mechanism.

4. In a rug making machine for forming stitches of yarn in a sheet of backing material comprising carriage guiding means adapted to extend alongside a sheet of backing material, a carriage mounted on said guiding means so as to be movable therealong, means for moving said carriage therealong, a platform mounted on said carriage for movement with respect thereto in a direction at right angles to the direction of movement of said carriage, stitching mechanism carried by said platform, movable with respect thereto, and adapted to form stitches in said backing material by alternately extending out from said platform toward said backing material so as to penetrate said backing material and withdrawing from said extended position so as to disengage from said backing material, means to actuate said stitching mechanism while said carriage is moving in a given direction, thus forming a row of stitches along said backing material, and means for positioning said platform in its movement with respect to said carriage so that the location of said row of stitches on said backing material may be controlled, said stitching mechanism being mounted on a support so as to be reciprocable with respect thereto, said support being movably mounted on said platform so as to be projectable out therefrom toward said backing material, an element on said support other than said stitching mechanism adapted to engage with said backing material when said support is projected out from said platform, and means for thus projecting said support outwardly with respect to said platform with a predetermined force, thereby providing for a constant degree of tautness in said backing material where it is penetrated by said loop-forming mechanism; the improvement which comprises sensing means on said carriage engageable with said backing material in advance of said stitching mechanism as said carriage moves in said given direction so as to sense the approach of said stitching mechanism to a seam in said backing material, and control means operatively connected thereto and to said support projection means and effective to increase the force with which said support is outwardly projected in response to the sensing of said seam, said control means including a time-delay mechanism the time effect of which is related to the distance by which said sensing means leads said stitching mechanism, and also including an automatic and timed resetting system effective to restore the original projection force magnitude after said stitching mechanism has passed said seam, thus providing for an increased tautness in said backing material when a seam is to be penetrated by said loop forming mechanism.

5. In a rug making machine for forming stitches of yarn in a sheet of backing material comprising carriage guiding means adapted to extend alongside a sheet of backing material, a carriage mounted on said guiding means so as to be movable therealong, means for moving said carriage therealong, a platform mounted on said carriage for movement with respect thereto in a direction at right angles to the direction of movement of said carriage, stitching mechanism carried by said platform, movable with respect thereto, and adapted to form stitches in said backing material by alternately extending out from said platform toward said backing material so as to penetrate said backing material and withdrawing from said extended position so as to disengage from said backing material, means to actuate said stitching mechanism while said carriage is moving in a given direction, thus forming a row of stitches along said backing material, and means for positioning said platform in its movement with respect to said carriage so that the location of said row of stitches on said backing material may be controlled, said stitching mechanism being mounted on a support so as to be reciprocable with respect thereto, said support being movably mounted on said platform so as to be projectable out therefrom toward said backing material, an element on said support other than said stitching mechanism adapted to engage with said backing material when said support is projected out from said platform, and means for thus projecting said support outwardly with respect to said platform with a predetermined force, thereby providing for a constant degree of tautness in said backing material where it is penetrated by said loop-forming mechanism; the improvement which comprises means to retract said support with respect to said platform so as to disengage said support element from said backing material, and means sensitive to the motion of said carriage in said given direction, operatively connected to said retracting means, and effective to actuate said retracting means except when said carriage is moving in said given direction.

6. In a rug making machine for forming stitches of yarn in a sheet of backing material comprising carriage guiding means adapted to extend alongside a sheet of backing material, a carriage mounted on said guiding means so as to be movable therealong, means for moving said carriage therealong, a platform mounted on said carriage for movement with respect thereto in a direction at right angles to the direction of movement of said carriage, stitching mechanism carried by said platform, movable with respect thereto, and adapted to form sttiches in said backing material by alternately extending out from said platform toward said backing material so as to penetrate said backing material and withdrawing from said extended position so as to disengage from said backing material, means to actuate said stitching mechanism while said carriage is moving in a given direction, thus forming a row of stitches along said backing material, and means for positioning said platform in its movement with respect to said carriage so that the location of said row of stitches on said backing material may be controlled, said stitching mechanism being mounted on a support so as to be reciprocable with respect thereto, said support being movably mounted on said platform so as to be projectable out therefrom toward said backing material, an element on said support other than said stitching mechanism adapted to engage with said backing material when said support is projected out from said platform, and means for thus projecting said support outwardly with respect to said platform with a predetermined force, thereby providing for a constant degree of tautness in said backing material where it is penetrated by said loop-forming mechanism; the improvement which comprises means to retract said support with respect to said platform so as to disengage said support element from said backing material, and means sensitive to the motion of said carriage in said given direction, operatively connected to said retracting means, and effective to actuate said retracting means except when said carriage is moving in said given direction, said means including delay mechanism effective to actuate said projecting means only a predetermined time after said carriage is started moving in said given direction, thus permitting said carriage to come up to speed before said support is projected outwardly.

7. In a rug making machine for forming stitches of yarn in a sheet of backing material comprising carriage guiding means adapted to extend alongside a sheet of backing material, a carriage mounted on said guiding means so as to be movable therealong, means for moving said carriage therealong, a platform mounted on said carriage for movement with respect thereto in a direction at right angles to the direction of movement of said carriage, stitching mechanism carried by said platform, movable with respect thereto, and adapted to form stitches in said backing material by alternately extending out from said platform toward said backing material so as to penetrate said backing material and withdrawing from said extended position so as to disengage from said backing material, means to actuate said stitching mechanism while said carriage is moving in a given direction, thus forming a row of stitches along said backing material, and means for positioning said platform in its movement with respect to said carriage so that the location of said row of stitches on said backing material may be controlled, said stitching mechanism being mounted on a support so as to be reciprocable with respect thereto, said support being movably mounted on said platform so as to be projectable out therefrom toward said backing material, an element on said support other than said stitching mechanism adapted to engage with said backing material when said support is projected out from said platform, and means for thus projecting said support outwardly with respect to said platform with a predetermined force, thereby providing for a constant degree of tautness in said backing material where it is penetrated by said loop-forming mechanism; the improvement which comprises means to retract said support with respect to said platform so as to disengage said support element from said backing material, and means sensitive to the motion of said platform with respect to said carriage, operatively connected to said retracting means, and effective to actuate said retracting means whenever said platform is moving relative to said carriage.

8. In apparatus adapted to be positioned adjacent a sheet of backing material and adapted to make rugs by stitching yarn through said sheet of backing material, said apparatus comprising stitching mechanism movable to form stitches by being reciprocated so as to alternately penetrate and be withdrawn from said backing material, said stitching mechanism being also movable in a direction substantially perpendicular to the direction in which it is reciprocated, thereby being movable along said backing material in a given direction, a support for said stitching mechanism, an element on said support other than said stitching mechanism extending therefrom in the direction of reciprocation of said stitching mechanism and adapted to engage said backing material, a member on which said support is movably mounted and means for moving said support out from said member toward said backing material with a predetermined force, said element then engaging said backing material and providing for a constant degree of tautness therein where it is penetrated by said stitching mechanism; the improvement which comprises sensing means engageable with said backing material in advance of said stitching mechanism as the latter moves in said given direction so as to sense the approach of said stitching mechanism to a seam in said backing material, and control means operatively connected thereto and to said support moving means and effective to increase the force with which said support is moved toward said backing material in response to the sensing of said seam, thus providing for an increased tautness in said backing material when a seam is to be penetrated by said stitching mechanism.

9. In apparatus adapted to be positioned adjacent a sheet of backing material and adapted to make rugs by stitching yarn through said sheet of backing material, said apparatus comprising stitching mechanism movable to form stitches by being reciprocated so as to alternately penetrate and be withdrawn from said backing material, said stitching mechanism being also movable in a direction substantially perpendicular to the direction in which it is reciprocated, thereby being movable along said backing material in a given direction, a support for said stitching mechanism, an element on said support other than said stitching mechanism extending therefrom in the direction of reciprocation of said stitching mechanism and adapted to engage said backing material, a member on which said support is movably mounted and means for moving said support out from said member toward said backing material with a predetermined force, said element then engaging said backing material and providing for a constant degree of tautness therein where it is penetrated by said stitching mechanism; the improvement which comprises sensing means engageable with said backing material in advance of said stitching mechanism as the latter moves in said given direction so as to sense the approach of said stitching mechanism to a seam in said backing material, and control means operatively connected thereto and to said support moving means and effective to increase the force with which said support is moved toward said backing material in response to the sensing of said seam, said control means including a time delay mechanism the time effect of which is related to the distance by which said sensing means leads said stitching mechanism, and also including an automatic and timed resetting system effective to restore the original force magnitude after said stitching mechanism has passed said seam, thus providing for an increased tautness in said backing material when a seam is to be penetrated by said stitching mechanism.

10. In apparatus adapted to be positioned adjacent a sheet of backing material and adapted to make rugs by stitching yarn through said sheet of backing material, said apparatus comprising stitching mechanism movable to form stitches by being reciprocated so as to alternately penetrate and be withdrawn from said backing material, said stitching mechanism being also movable in a direction substantially perpendicular to the direction in which it is reciprocated, thereby being movable along said backing material in a given direction, a support for said stitching mechanism, an element on said support other than said stitching mechanism extending therefrom in the direction of reciprocation of said stitching mechanism and adapted to engage said backing material, a member on which said support is movably mounted and means for moving said support out from said member toward said backing material with a predetermined force, said element then engaging said backing material and providing for a constant degree of tautness therein where it is penetrated by said stitching mechanism; the improvement which comprises means for moving said support toward said backing material comprising a piston movable within a pressure cylinder and operatively connected to said support, means for exerting pressure of a given magnitude on said piston in a direction such as to move said support out from said member and toward said backing material, means for exerting pressure on said piston in the opposite direction so as to move said support inwardly with respect to said member and away from said backing material, and valve means for determining which of said pressure means shall be operative at a given time.

11. In the apparatus of claim 10, means for increasing the magnitude of the pressure exerted on said piston.

12. In the apparatus of claim 10, means for increasing the magnitude of the pressure exerted on said piston, sensing means engageable with said backing material in advance of said stitching mechanism as the latter moves in said stitch-forming direction, and control means operatively connected to said sensing means and to said means for increasing the pressure applied to said piston, said control means including a time delay mechanism the time effect of which is related to the distance by which said sensing means leads said stitching mechanism, and also including an automatic and timed resetting system, whereby when said sensing means detects the approach of a seam to said stitching mechanism the pressure exerted on said piston is first increased after a suitable time interval and then, after another time interval, is restored to its original magnitude, thus providing for an increased tautness in said backing material when a seam is to be penetrated by said stitching mechanism.

13. In the apparatus of claim 10, means for increasing the magnitude of the pressure exerted on said piston, and control means for initiating the withdrawal of said support from said backing material, said control means being operatively connected to the various pressure means, and effective, when said control means is actuated, to first increase the magnitude of the pressure applied to said piston and apply said pressure to said piston in a direction such as to withdraw said support from said backing material, and then, while keeping the pressure active on the same side of said piston, restoring the magnitude of said pressure to its original value.

14. In a rug making machine for forming stitches of yarn in a sheet of backing material comprising horizontal carriage guiding means adapted to extend alongside a sheet of backing material, a carriage mounted on said guiding means so as to be movable therealong, means for moving said carriage therealong, a structural member extending from said carriage in a vertical direction, a platform mounted on said structural member so as to be movable therealong, means for positioning said platform along said structural member, stitching mechanism carried by said platform and movable with respect thereto to form stitches in said backing material by alternately extending out from said platform to penetrate said backing material and withdrawing from said extended position so as to disengage from said backing material, a support mounted on said platform so as to be movable out therefrom in a substantially horizontal direction toward said backing material, said stitching mechanism being mounted on said support, means for urging said support outwardly with respect to said platform with a predetermined force, and an element on said support other than said stitching mechanism adapted to engage with said backing material when said support is urged outwardly from said platform; the improvement which comprises means sensitive to the movement of said carriage in a given direction only and effective to prevent said platform from moving along said structural member while said carriage is moving in said given direction.

References Cited in the file of this patent

UNITED STATES PATENTS

| | | |
|---|---|---|
| 1,757,795 | Dahlen | May 6, 1930 |
| 1,972,265 | Hofmann et al. | Sept. 4, 1934 |
| 1,980,294 | Ross et al. | Nov. 13, 1934 |
| 2,400,529 | Behrens | May 21, 1946 |
| 2,518,147 | Johnson et al. | Aug. 8, 1950 |
| 2,595,585 | Kline | May 6, 1952 |
| 2,651,275 | Moore | Sept. 8, 1953 |